United States Patent
Dokai

(10) Patent No.: US 9,864,943 B2
(45) Date of Patent: *Jan. 9, 2018

(54) WIRELESS COMMUNICATION DEVICE

(71) Applicant: Murata Manufacturing Co., Ltd., Nagaokakyo-shi, Kyoto-fu (JP)

(72) Inventor: Yuya Dokai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 279 days.

This patent is subject to a terminal disclaimer.

(21) Appl. No.: 14/487,209

(22) Filed: Sep. 16, 2014

(65) Prior Publication Data

US 2015/0001305 A1 Jan. 1, 2015

Related U.S. Application Data

(63) Continuation of application No. 13/970,633, filed on Aug. 20, 2013, now Pat. No. 8,878,739, which is a
(Continued)

(30) Foreign Application Priority Data

Jul. 14, 2011 (JP) ................................ 2011-155294

(51) Int. Cl.
*H01Q 1/22* (2006.01)
*H01Q 1/38* (2006.01)
(Continued)

(52) U.S. Cl.
CPC ... *G06K 19/0726* (2013.01); *G06K 19/07722* (2013.01); *G06K 19/07754* (2013.01);
(Continued)

(58) Field of Classification Search
CPC .. H01Q 1/2208; H01Q 1/2225; H01Q 1/2283; H01Q 7/00; H01Q 9/06; G06K 19/0726; G06K 19/07722; G06K 19/07754
(Continued)

(56) References Cited

U.S. PATENT DOCUMENTS 6,107,920 A * 8/2000 Eberhardt ............ B65D 5/4233
257/673
8,878,739 B2 * 11/2014 Dokai ...................... H01Q 9/06
343/748
(Continued)

FOREIGN PATENT DOCUMENTS

CN 101460964 A 6/2009
CN 101542830 A 9/2009
(Continued)

OTHER PUBLICATIONS

Official Communication issued in corresponding Japanese Patent Application No. 2014-029327, dated Nov. 18, 2014.
(Continued)

*Primary Examiner* — Dameon E Levi
*Assistant Examiner* — Jennifer F Hu
(74) *Attorney, Agent, or Firm* — Keating & Bennett, LLP

(57) ABSTRACT

A wireless communication device includes a wireless IC device, a multilayer substrate including a stack of a plurality of dielectric layers, a resonant circuit that is connected to the wireless IC device and that includes a capacitance element provided in the multilayer substrate and an inductance element provided outside the multilayer substrate, and a radiation conductor connected to the resonant circuit.

7 Claims, 6 Drawing Sheets

Related U.S. Application Data continuation of application No. PCT/JP2012/067779, filed on Jul. 12, 2012.

(51) Int. Cl.

| | | |
|---|---|---|
| *H01Q 1/48* | (2006.01) | |
| *G06K 19/07* | (2006.01) | |
| *H01Q 9/06* | (2006.01) | |
| *H01Q 7/00* | (2006.01) | |
| *G06K 19/077* | (2006.01) | |
| *H04B 5/00* | (2006.01) | |

(52) U.S. Cl.
CPC .............. *H01Q 1/2225* (2013.01); *H01Q 1/38* (2013.01); *H01Q 1/48* (2013.01); *H01Q 7/00* (2013.01); *H01Q 9/06* (2013.01); *H04B 5/0062* (2013.01); *H04B 5/0075* (2013.01)

(58) Field of Classification Search
USPC ........................................................ 343/748
See application file for complete search history.

(56) References Cited

U.S. PATENT DOCUMENTS

| | | | | |
|---|---|---|---|---|
| 2001/0016251 A1* | 8/2001 | Sugimoto | ............. | C04B 35/457 428/209 |
| 2002/0030561 A1* | 3/2002 | Masuda | ................... | H03H 3/00 333/177 |
| 2004/0066617 A1* | 4/2004 | Hirabayashi | ........ | H01L 21/4857 361/750 |
| 2004/0217915 A1* | 11/2004 | Imaizumi | ................. | H03H 7/38 343/860 |
| 2005/0122211 A1* | 6/2005 | Yoshigi | .............. | G06K 19/0726 340/10.1 |
| 2006/0055601 A1* | 3/2006 | Kameda | ................... | H01Q 1/38 343/700 MS |
| 2007/0164414 A1* | 7/2007 | Dokai | .............. | G06K 19/07749 257/679 |
| 2009/0002130 A1* | 1/2009 | Kato | ................ | G06K 19/07749 340/10.1 |
| 2009/0009007 A1* | 1/2009 | Kato | .................. | G06K 19/0701 307/104 |
| 2009/0021446 A1* | 1/2009 | Kataya | ............. | G06K 19/07749 343/860 |
| 2009/0065594 A1* | 3/2009 | Kato | ................ | G06K 19/07749 235/492 |
| 2009/0109102 A1* | 4/2009 | Dokai | ................ | G06K 7/10178 343/702 |
| 2009/0262041 A1* | 10/2009 | Ikemoto | ........... | G06K 19/07749 343/860 |
| 2009/0266900 A1* | 10/2009 | Ikemoto | ................ | H01Q 1/243 235/492 |
| 2009/0278687 A1* | 11/2009 | Kato | ................ | G06K 19/07749 340/572.1 |
| 2010/0308118 A1* | 12/2010 | Kataya | ..................... | H01Q 7/00 235/492 |
| 2011/0031320 A1* | 2/2011 | Kato | ................ | G06K 19/07749 235/492 |
| 2011/0199713 A1 | 8/2011 | Kato et al. | | |
| 2013/0335281 A1 | 12/2013 | Dokai | | |

FOREIGN PATENT DOCUMENTS

| | | |
|---|---|---|
| JP | 2006-190774 A | 7/2006 |
| JP | 4535209 B2 | 9/2010 |
| JP | 5488767 B2 | 5/2014 |
| WO | 2007/125752 A1 | 11/2007 |
| WO | 2010/082413 A1 | 7/2010 |

OTHER PUBLICATIONS

Dokai, "Wireless Communication Device", U.S. Appl. No. 13/970,633, filed Aug. 20, 2013.
Official Communication issued in corresponding Japanese Patent Application No. 2014-029327, dated Mar. 3, 2015.

\* cited by examiner

WIRELESS COMMUNICATION DEVICE

This application claims priority to Japanese Patent Application No. 2011-155294 filed on Jul. 14, 2011 and International Patent Application No. PCT/JP2012/067779 filed on Jul. 12, 2012, the entire disclosures of which are incorporated herein by reference.

BACKGROUND OF THE INVENTION

1. Field of the Invention

The present invention relates to a wireless communication device including a resonant circuit connected to a wireless IC device and a radiation conductor connected to the resonant circuit.

2. Description of the Related Art

Recently, radio frequency identification (RFID) systems have been used for various applications such as commodity management. An RFID system includes a reader/writer and an RFID tag. To transmit information to each other through non-contact communication, a reader/writer and an RFID tag each include a wireless IC device (i.e., RFID IC chip) and a radiation conductor (i.e., antenna).

When information is to be transmitted, the wireless IC device modulates a carrier by using information that is to be transmitted, generates a high frequency signal, and outputs the generated high frequency signal to the radiation conductor. The radiation conductor transmits (i.e., radiates) the received high frequency signal to a communication target. When information is to be received, the radiation conductor receives a high frequency signal from a communication target, and outputs it to the wireless IC device. The wireless IC device reproduces information from the received high frequency signal.

In known techniques, examples of the RFID tag described above include wireless communication devices described in Japanese Patent No. 4301346 and Japanese Patent No. 4535209. In Japanese Patent No. 4301346 and Japanese Patent No. 4535209, a wireless communication device includes an electromagnetic coupling module and a printed wiring circuit board on which a loop-shaped electrode is formed. The electromagnetic coupling module includes a wireless IC device and a feeder circuit substrate on which the wireless IC device is mounted. The feeder circuit substrate is a multilayer substrate having a plurality of dielectric layers stacked one on top of another. Coil patterns constituting an inductance element and electrode patterns constituting a capacitance element are formed in the multilayer substrate. The inductance element and the capacitance element form a resonant circuit having a resonant frequency corresponding to a carrier frequency. The electromagnetic coupling module is mounted on the printed wiring circuit board, and is electrically connected to the loop-shaped electrode.

However, in the above-described wireless communication device, the coil patterns (pattern conductors) are formed in the multilayer substrate, resulting in a first problem in that loss caused by a material of the pattern conductors or dielectric substrates is apt to increase. Especially when the size of the multilayer substrate is to be reduced, it is necessary, for example, to narrow the line width of a coil pattern in order to obtain a desired inductance value, causing the insertion loss to be further increased.

The above-described wireless communication device has a second problem in that misalignment of a dielectric layer causes variations in the capacitance of the capacitance element in the multilayer substrate.

SUMMARY OF THE INVENTION

Therefore, preferred embodiments of the present invention provide a wireless communication device which enables insertion loss to be reduced and provide a wireless communication device which makes it difficult for variations in capacitance to occur even when a dielectric layer is misaligned.

According to a first aspect of a preferred embodiment of the present invention, a wireless communication device includes a wireless IC device, a multilayer substrate including a stack of a plurality of dielectric layers, a resonant circuit connected to the wireless IC device, and a radiation conductor connected to the resonant circuit. The resonant circuit includes a capacitance element provided inside the multilayer substrate, and an inductance element provided outside the multilayer substrate.

According to a second aspect of a preferred embodiment of the present invention, a wireless communication device includes a wireless IC device, a multilayer substrate including a stack of a plurality of dielectric layers, a resonant circuit connected to the wireless IC device, and a radiation conductor connected to the resonant circuit. The resonant circuit includes an inductance element and a capacitance element. The capacitance element is provided in the multilayer substrate.

In the second aspect, the capacitance element includes first and second electrode patterns located on at least one layer of the dielectric layers, and third and fourth electrode patterns that are located on at least another layer of the dielectric layers and that are opposite to the first and second electrode patterns. The first and fourth electrode patterns have an identical potential, and the second and third electrode patterns have an identical potential. In a plan view in a stacking direction of the dielectric layers, an outline of one of the first and third electrode patterns is located inside an outline of the other, and an outline of one of the second and fourth electrode patterns is located inside an outline of the other.

According to the above-described first aspect, a wireless communication device can be provided which enables insertion loss to be significantly reduced or prevented.

According to the above-described second aspect, a wireless communication device can be provided which makes it difficult for variation in capacitance to occur even when a dielectric layer is misaligned.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

For convenience of description below, arrows x, y, and z used in some of the drawings are defined. The arrows x and y indicate the left-right direction and the front-back direction of a wireless communication device, respectively. The arrow z indicates the up-down direction of the wireless communication device, and also indicates the stacking direction of a multilayer substrate.

Referring to FIGS. 1A to 5, a wireless communication device 100 according to a preferred embodiment of the present invention will be described in detail. The wireless communication device 100 preferably is, for example, an RFID tag used in a UHF band RFID system. A carrier frequency in 900 MHz band is used in a UHF band RFID system. A UHF band RFID system has characteristics of having a long communication distance and being capable of simultaneously reading out pieces of information of multiple RFID tags. Therefore, a UHF band RFID system has been a promising system for commodity management. The wireless communication device 100 and a wireless communication device 500 each are not limited to an RFID tag used in a UHF band RFID system, and may be an RFID tag used in an RFID system using another frequency band, such as the HF band (13 MHz band) or the 2.4 GHz band.

Figure 1A:
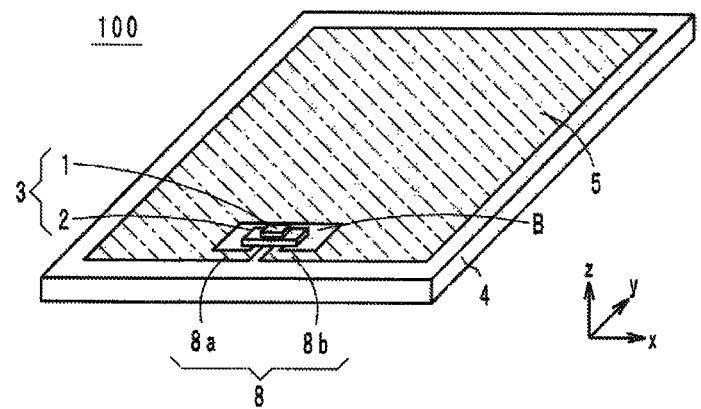
FIG. 1A is a perspective view illustrating a wireless communication device according to a preferred embodiment of the present invention.
Figure 1B:
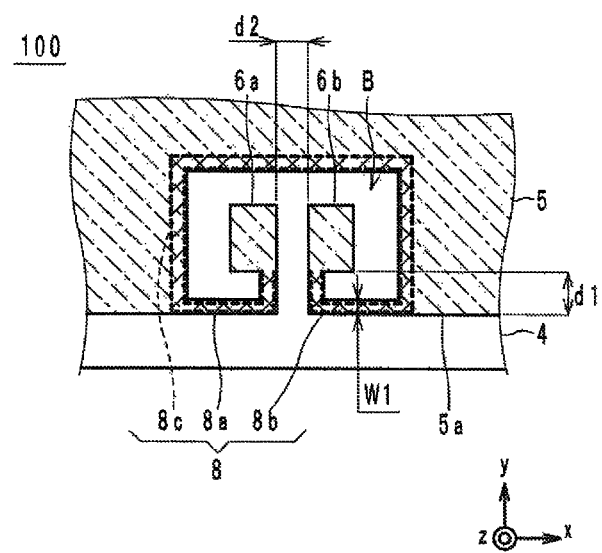
FIG. 1B is an enlarged view of a principal portion of the wireless communication device in FIG. 1A, viewed in a stacking direction.

The wireless communication device 100 is preferably configured as an RFID tag, and can be installed in various communication terminals including a cellular phone, for example. To perform non-contact communication so as to exchange information with, for example, a reader/writer, the wireless communication device 100 roughly includes a feeding device 3 including a wireless IC device 1 and a multilayer substrate 2, a printed circuit board (hereinafter, referred to as a PCB) 4, a radiation conductor (that is, antenna conductor) 5, first and second land electrodes 6a and 6b, and an inductance element 8, as illustrated in FIGS. 1A and 1B. For the sake of convenience, the land electrodes 6a and 6b are not illustrated in FIG. 1A, and the feeding device 3 is not illustrated in FIG. 1B.

Figure 2:
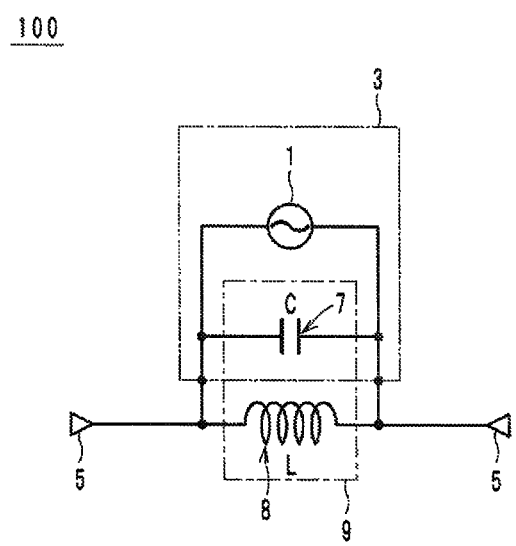
FIG. 2 is an equivalent circuit diagram of the wireless communication device in FIG. 1A.

As illustrated in FIG. 2, the wireless communication device 100 illustrated as an equivalent circuit includes the wireless IC device 1, radiation conductors 5, and a resonant circuit 9 including a capacitance element 7 and the inductance element 8.

The wireless IC device 1 is an integrated circuit device (RFID IC chip) that processes a high frequency signal received/transmitted in an RFID system, and includes a logic circuit and a memory circuit. This integrated circuit device is a chip type element formed of, for example, a silicon semiconductor. As the wireless IC device 1, a packaged device installed on or embedded in a substrate, such as a ceramic substrate or a resin substrate, may be used, or a bare chip may be used.

When information is to be transmitted, the wireless IC device 1 modulates a carrier having a 900 MHz band frequency by using the information that is to be transmitted, generates a high frequency signal, and outputs it to the resonant circuit 9. A high frequency signal is preferably a differential signal. The wireless IC device 1 is connected to the radiation conductor 5 described below. Preferably, a differential transmission path is used for the connection. A differential transmission path is constituted by a line for transmission of a positive-phase signal and a line for transmission of a reverse-phase signal whose phase is different from that of the positive-phase signal by 180°. To output a positive-phase signal and a reverse-phase signal, first and second external electrodes (not illustrated) are provided on the back surface of the wireless IC device 1. Further, two non-contact (NC) terminals (not illustrated) are provided on the back surface of the wireless IC device 1. When information is to be received, the wireless IC device 1 receives a high frequency signal in 900 MHz band via the radiation conductors 5, and demodulates the received signal so as to obtain predetermined information.

The multilayer substrate 2 is a stack including a plurality of dielectric layers stacked one on top of another. Each of the dielectric layers preferably has the same or substantially the same rectangular shape. The dielectric layers preferably are dielectric ceramic layers such as low temperature co-fired ceramics (LTCC) layers, for example. Alternatively, the stack may include a plurality of dielectric resin layers, such as those composed of thermosetting resin or thermoplastic resin, stacked one on top of another, for example. The detailed structure of the multilayer substrate 2 will be described below with reference to FIG. 3.

Figure 3:
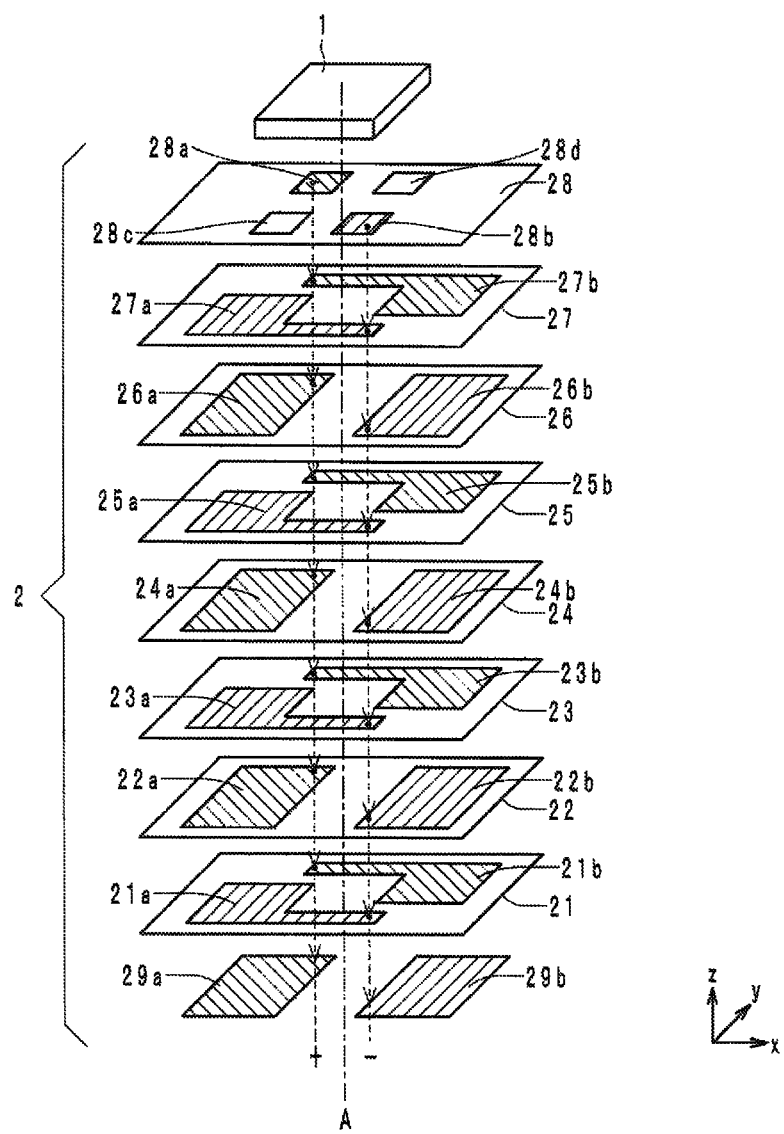
FIG. 3 is an exploded perspective view of a multilayer substrate in FIG. 1A.

FIG. 3 illustrates an example in which eight dielectric layers, dielectric layers 21 to 28, are present. Each of the dielectric layers 21 to 28 preferably has the same or substantially the same rectangular or substantially rectangular shape. The dielectric layer 21 is the lowest layer (the first layer). The dielectric layer 22 is stacked on the principal surface (in the present preferred embodiment, the top surface) of the dielectric layer 21. Similarly, each of the dielectric layers 23 to 28 is stacked on the principal surface of the closest lower layer of the dielectric layers 22 to 27. The dielectric layer 28 is the topmost layer (the eighth layer). For convenience of description below, a reference character A is assigned to an intersection point of two diagonal lines of each of the above-described principal surfaces. To prevent FIG. 3 from being complicated, the intersection points A are represented by a long dashed short dashed line.

First and second external electrodes 29a and 29b are provided on the opposite surface (in the present preferred embodiment, the bottom surface) parallel or substantially parallel to the principal surface in the dielectric layer 21, for example, through application of a conductive paste. These external electrodes 29a and 29b are used to connect the multilayer substrate 2 to the inductance element 8 on the PCB 4. The first external electrode 29a is located, for example, at a predetermined distance in the opposite direction of the arrow x from the intersection point A of the above-described opposite surface. The shape of the second external electrode 29b preferably is the same or substantially the same as a shape obtained when the first external electrode 29a is revolved by about 180° around the intersection point A of the above-described opposite surface.

Each of first electrode patterns 21a, 23a, 25a, and 27a is preferably formed through, for example, printing at the same or substantially the same position on the principal surface of a corresponding one of the dielectric layers 21, 23, 25, and 27. The electrode patterns 21a, 23a, 25a, and 27a are composed of a conducting material, and more specifically, of a conducting material having a small specific resistance and being mainly composed of silver, copper, or the like.

The above-described electrode patterns 21a, 23a, 25a, and 27a preferably have the same or substantially the same shape. More specifically, each of the electrode patterns 21a, 23a, 25a, and 27a has an electrode portion having a rectangular or substantially rectangular shape and a connecting conductor portion. An electrode portion is located at a predetermined distance in the opposite direction of the arrow x from the intersection point A of a corresponding principal surface. A connecting conductor portion extends in the forward direction of the arrow x from a corresponding electrode portion to a corresponding negative-pole-side via hole conductor (described below).

Further, each of second electrode patterns 21b, 23b, 25b, and 27b composed of the above-described conducting material is preferably formed through, for example, printing on the principal surface of a corresponding one of the dielectric layers 21, 23, 25, and 27. The shape of each of the electrode patterns 21b, 23b, 25b, and 27b preferably is the same or substantially the same as a shape obtained when a corresponding one of the electrode patterns 21a, 23a, 25a, and 27a is revolved by about 180° around the intersection point A of the corresponding principal surface. Therefore, each of the electrode patterns 21b, 23b, 25b, and 27b includes an electrode portion which is located at a predetermined distance in the forward direction of the arrow x from the intersection point A of a corresponding principal surface, and also includes a connecting conductor portion which extends in the opposite direction of the arrow x from a corresponding electrode portion to a corresponding positive-pole-side via hole conductor (described below).

Each of third electrode patterns 22a, 24a, and 26a composed of the above-described conducting material is preferably formed through, for example, printing at the same or substantially the same position on the principal surface of a corresponding one of the dielectric layers 22, 24, and 26. The electrode patterns 22a, 24a, and 26a preferably have the same or substantially the same shape. More specifically, each of the electrode patterns 22a, 24a, and 26a is constituted by an electrode portion having a rectangular or substantially rectangular shape. An electrode portion is located at a predetermined distance in the opposite direction of the arrow x from the intersection point A of a corresponding principal surface.

Further, each of fourth electrode patterns 22b, 24b, and 26b composed of the above-described conducting material is preferably formed through, for example, printing on the principal surface of a corresponding one of the dielectric layers 22, 24, and 26. The shape of each of the electrode patterns 22b, 24b, and 26b is preferably the same or substantially the same as a shape obtained when a corresponding one of the electrode patterns 22a, 24a, and 26a is revolved by about 180° around the intersection point A of the corresponding principal surface.

Figure 4A:
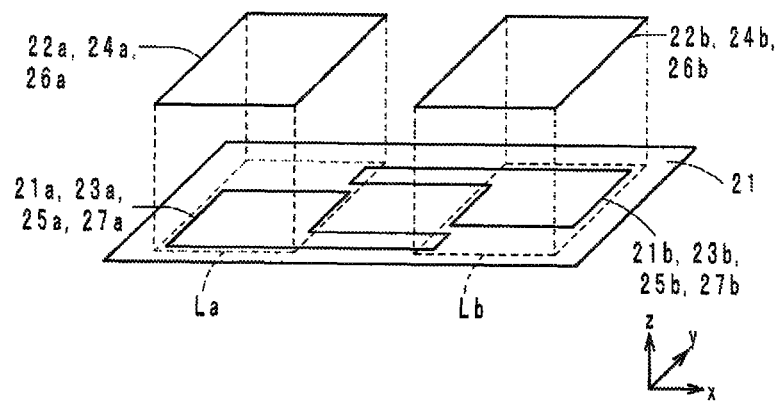
FIG. 4A is a schematic diagram illustrating the relationship among the dimensions of first, second, third and fourth electrode patterns illustrated in FIG. 3.

Referring to FIG. 4A, as described above, at the same or substantially the same position on the principal surfaces of the dielectric layers 21, 23, 25, and 27, the electrode patterns 21a, 23a, 25a, and 27a having substantially the same shape are formed at substantially the same position of the dielectric layers 21, 23, 25, and 27. Therefore, as illustrated in FIG. 4A, when the electrode patterns 21a, 23a, 25a, and 27a are projected on the principal surface of the dielectric layer 21 in the arrow z direction, that is, when these are viewed in plan view in the arrow z direction, the electrode portions of the electrode patterns 21a, 23a, 25a, and 27a match each other.

Similarly, when the electrode patterns 22a, 24a, and 26a are viewed in plan view in the arrow z direction, these patterns match each other. At the same or substantially the same position on the principal surfaces of the dielectric layers 22, 24, and 26, the electrode patterns 21a, 23a, 25a, and 27a having the same or substantially the same shape are formed at the same or substantially the same position of the dielectric layers 21, 23, 25, and 27.

In the present preferred embodiment, when the multilayer substrate 2 is viewed in plan view in the arrow z direction, the electrode patterns 21a to 27a are arranged so that the outlines of the electrode portions of the electrode patterns 21a, 23a, 25a, and 27a are present inside an outline La of the electrode patterns 22a, 24a, and 26a. In a similar plan view described above, the electrode portions of the electrode patterns 21b, 23b, 25b, and 27b are present inside an outline Lb of the electrode patterns 22b, 24b, and 26b. The positional relationship and the dimensions illustrated in FIG. 4A allow reduction in variation which occurs in the capacitance of the capacitance element 7 and which is caused by misalignments of the dielectric layers 21 to 27. Detailed description will be provided below.

Figure 4B:
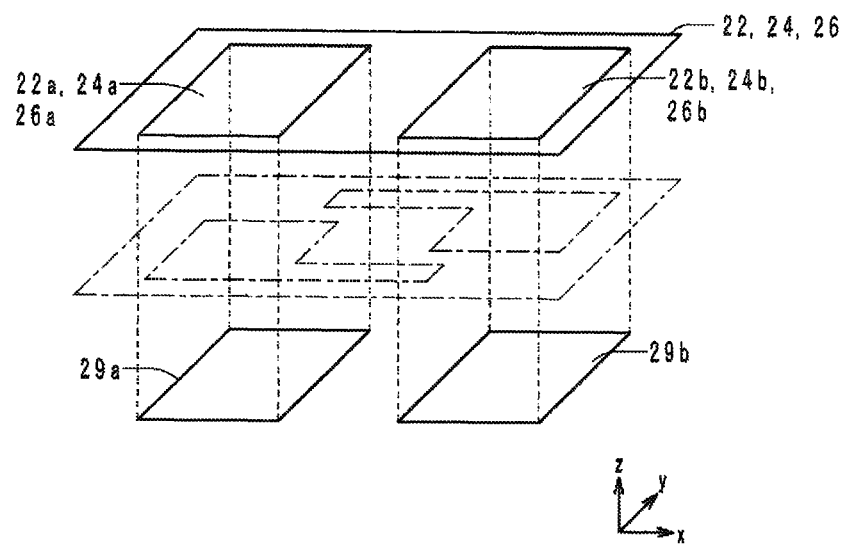
FIG. 4B is a schematic diagram illustrating the relationship between the dimensions of the first and second electrode patterns and the dimensions of first and second external electrodes illustrated in FIG. 3.

Referring to FIG. 4B, the first external electrode 29a and the electrode patterns 22a, 24a, and 26a are arranged so that, when the multilayer substrate 2 is seen in plan view in the arrow z direction, the outlines of the electrode patterns 22a, 24a, and 26a match or substantially match the outline of the first external electrode 29a. In a similar plan view as described above, the outlines of the electrode patterns 22b, 24b, and 26b match or substantially match the outline of the second external electrode 29b. The positional relationship and the dimensions illustrated in FIG. 4B allow electric charge whose amount is equivalent to, for example, that between the electrode pattern 21a and the electrode pattern 22a to be accumulated between the first external electrode 29a and the electrode pattern 21a and between the second external electrode 29b and electrode pattern 21b. Detailed description will be provided below.

Referring back to FIG. 3, a first input-output terminal 28a, a second input-output terminal 28b, and two non-contact (NC) terminals 28c and 28d are located on the principal surface of the dielectric layer 28. These input-output terminals 28a and 28b and these NC terminals 28c and 28d composed of the above-described conducting material are preferably formed through, for example, printing. The first input-output terminal 28a and the second input-output terminal 28b have the point symmetry relationship using the intersection point A of the corresponding principal surface as the central point. The NC terminals 28c and 28d have a similar point symmetry relationship.

When the multilayer substrate 2 is viewed in plan view in the arrow z direction, the following portions overlap each other: the first input-output terminal 28a; an end portion of the connecting conductor of the electrode pattern 27b; a corner portion of the third electrode pattern 26a; an end portion of the connecting conductor of the electrode pattern 25b; a corner portion of the third electrode pattern 24a; an end portion of the connecting conductor of the electrode pattern 23b; a corner portion of the electrode pattern 22a; an end portion of the connecting conductor of the electrode pattern 21b; and a corner portion of the first external electrode 29a. To connect these overlapped portions electrically, a via hole is formed through the dielectric layers 21 to 28, and the via hole is filled with a conductor paste. Thus, a first via hole conductor is provided.

In a similar plan view as described above, the following portions overlap each other: the second input-output terminal 28b; an end portion of the connecting conductor of the electrode pattern 27a; a corner portion of the fourth electrode pattern 26b; an end portion of the connecting conductor of the electrode pattern 25a; a corner portion of the fourth electrode pattern 24b; an end portion of the connecting conductor of the electrode pattern 23a; a corner portion of the electrode pattern 22b; an end portion of the connecting conductor of the electrode pattern 21a; and a corner portion of the second external electrode 29b. A second via hole conductor is formed through the dielectric layers 21 to 28 so as to connect these portions electrically.

Hereinafter, the above-described first via hole conductor may be called a positive-pole-side via hole conductor. The above-described second via hole conductor may be called a negative-pole-side via hole conductor. These via hole conductors are represented by symbols ● without a reference character for convenience of illustration in FIG. 3.

The dielectric layers on which the above-described electrode patterns and the like are provided are stacked on top of one another through compression and then fired, such that the multilayer substrate 2 is formed. The wireless IC device 1 is mounted on the top surface of the multilayer substrate 2 thus obtained (that is, the principal surface of the dielectric layer 28). As described above, the wireless IC device 1 includes the first external electrode which outputs a positive-phase signal, the second external electrode which outputs a reverse-phase signal, and the two NC terminals. The first external electrode is connected to the first input-output terminal 28a through soldering or the like. The second external electrode is connected to the second input-output terminal 28b through soldering or the like. Each of the NC terminals of the wireless IC device 1 is connected to a corresponding one of the NC terminals of the multilayer substrate 2 through soldering or the like.

Figure 5:
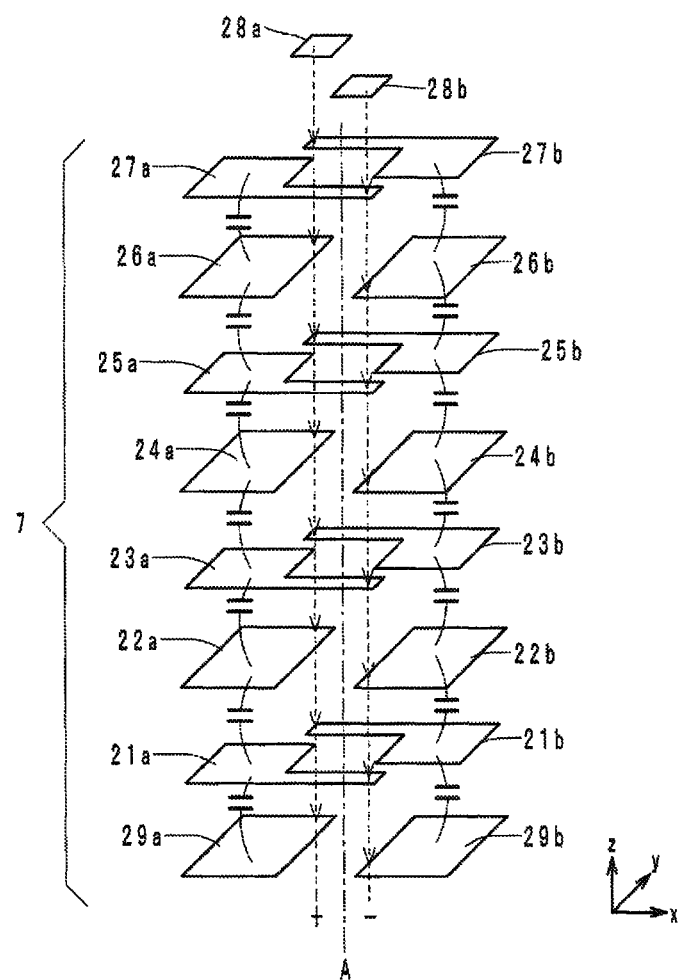
FIG. 5 is a schematic diagram illustrating capacitance elements located in the multilayer substrate in FIG. 1A.

Referring to FIG. 5, the capacitance element 7 generally includes the electrode patterns 21a to 27a, the electrode patterns 21b to 27b, and the external electrodes 29a and 29b. The combination of the electrode patterns 21a to 27a and the first external electrode 29a and the combination of the electrode patterns 21b to 27b and the second external electrode 29b are symmetric in the forward and opposite direction of the arrow x, with respect to a line connecting the intersection points A. In this configuration, when the first input-output terminal 28a is supplied with a positive-phase signal and the second input-output terminal 28b is supplied with a reverse-phase signal, the same or substantially the same potential is present between the input-output terminal 28a and the external electrode 29a, and the same or substantially the same potential is present between the input-output terminal 28b and the external electrode 29b. A differential signal supplied to the input-output terminals 28a and 28b is output from the external electrodes 29a and 29b while it holds the phase relationship between the positive-phase signal and the reverse-phase signal.

Referring back to FIGS. 1A and 1B, the PCB 4 is a printed circuit board installed in the above-described communication terminal. In the PCB 4, various digital and analog circuits, such as a driving circuit for a display included in the communication terminal, a power supply circuit, and a high frequency circuit, are arranged. In addition, various electronic components constituting these digital and analog circuits are mounted in the PCB 4.

The ground conductor 5 for these electronic components is provided on the principal surface of the above-described PCB 4. The ground conductor 5 also serves as a radiation conductor (that is, antenna element) 5 of the wireless communication device 100. The radiation conductor 5 preferably has a rectangular or substantially rectangular shape. The outline of the radiation conductor 5 may be any shape other than a rectangular or substantially rectangular shape. The radiation conductor 5 may include a slit or an opening.

A cutout portion B having a predetermined shape is formed near an edge 5a of the radiation conductor 5 as described above. By using the cutout portion B, the first and second land electrodes 6a and 6b and the inductance element 8 which are included in the configuration of the wireless communication device 100 are provided.

The land electrodes 6a and 6b are preferably composed of the same conducting material as that of the radiation conductor 5. As illustrated in FIG. 1B, the land electrodes 6a and 6b are located in a center portion of the cutout portion B, more specifically, at a predetermined distance d1 from the edge 5a of the radiation conductor 5 toward the center of the radiation conductor 5. In addition, the land electrodes 6a and 6b are spaced apart from each other in the x direction by a distance d2 based on the interval between the external electrodes 29a and 29b included in the multilayer substrate 2. The above-described multilayer substrate 2 is mounted on the land electrodes 6a and 6b.

The inductance element 8 is located outside the multilayer substrate 2, and includes a first wiring pattern 8a and a second wiring pattern 8b, each of which has a line width W1. The wiring pattern 8a extends in the opposite direction of the arrow y from the land electrode 6a, and bends midway in the opposite direction of the arrow x so as to be connected to the radiation conductor 5. The wiring pattern 8b extends from the land electrode 6b in the opposite direction of the arrow y and parallel to the wiring pattern 8a, and bends midway in the forward direction of the arrow x so as to be connected to the radiation conductor 5.

The wiring patterns 8a and 8b and a portion surrounding the cutout portion B in the radiation conductor 5 define a loop 8c as represented by a dotted line in FIG. 1B. Specifically, the loop 8c extends from the land electrode 6a through the wiring pattern 8a, the portion surrounding the cutout portion B in the radiation conductor 5, and the wiring pattern 8b to the land electrode 6b. In this configuration, when a high frequency signal (differential signal) is output from the external electrodes 29a and 29b of the multilayer substrate 2, a current loop is defined in the loop 8c.

As illustrated in FIG. 2, the resonant circuit 9 is a parallel resonant circuit constituted by the capacitance element included in the multilayer substrate 2 and the inductance element 8 located outside the multilayer substrate 2. The resonant circuit 9 is also a matching circuit that provides impedance matching between the wireless IC device 1 and the radiation conductor 5.

The resonant frequency of the resonant circuit 9 is substantially determined by the capacitance component and the inductance component of the resonant circuit. In the present preferred embodiment, a capacitance value C of the capacitance element 7 is dominant in the capacitance component, and an inductance value L of the inductance element 8 is dominant in the inductance component. One reason for this is that the inductance element 8 is located outside the multilayer substrate 2 so as to be spaced apart from the capacitance element 7. In other words, no stray capacitance is substantially generated between the wiring pattern 8a or the like in the inductance element 8 and the electrode pattern 21a or the like in the capacitance element 7. Therefore, the capacitance value C of the capacitance element 7 is dominant in the capacitance component.

Preferably, the capacitance value C and the inductance value L are determined so that the resonant frequency of the resonant circuit 9 is equal or substantially equal to the above-described carrier frequency. Thus, if the resonant circuit 9 has a resonant frequency which corresponds or substantially corresponds to the carrier frequency, the frequency of a high frequency signal received/transmitted at the radiation conductors 5 (that is, carrier frequency) can be substantially determined only in the resonant circuit 9 without frequency conversion in other circuits.

In the wireless communication device 100 having the configuration as described above, when information is to be transmitted, a high frequency signal generated in the wireless IC device 1 is transmitted via the resonant circuit 9 to the radiation conductors 5. The radiation conductors 5 radiate the high frequency signal to the antenna element of a communication target of the wireless communication device 100 (for example, a reader/writer). In the wireless communication device 100, when information is to be received, the radiation conductors 5 receive a high frequency signal radiated from an antenna element on the communication target side. The received high frequency signal is transmitted via the resonant circuit 9 to the wireless IC device 1.

The wireless communication device 100 includes the capacitance element 7 inside the multilayer substrate 2 and the inductance element 8 outside the multilayer substrate 2. Therefore, it is possible for the Q value of the inductance element 8 not to depend on the material of the dielectric substrates of the multilayer substrate 2. In addition, since the inductance element 8 is located outside the multilayer substrate 2, a desired inductance value can be obtained without narrowing the line width W1 of the wiring patterns 8a and 8b. Thus, the insertion loss of the inductance element 8 in the wireless communication device 100 can be reduced.

In the wireless communication device 100, when the multilayer substrate 2 is viewed in plan view in the arrow z direction, for example, the outline of the electrode portion of the electrode pattern 21a is present within the outline La of the electrode pattern 22a, and the electrode portion of the electrode pattern 21b is present within the outline Lb of the electrode pattern 22b (see FIG. 4A). Therefore, even when the dielectric layer 21 is slightly misaligned, the area in which the electrode pattern 22a overlaps the electrode pattern 21a is constant. Regarding this point, the same is true for the electrode pattern 22b and the electrode pattern 21b.

As understood from the foregoing description, in the capacitance element 7, even when the dielectric layer 21 is slightly misaligned, a capacitance between the electrode pattern 22a and the electrode pattern 21a and a capacitance between the electrode pattern 22b and the electrode pattern 21b are constant. Regarding this point, the same is true for each of the electrode patterns provided on a pair of adjacent dielectric layers in the arrow z direction. As described above, according to the present preferred embodiment, it is possible to provide the wireless communication device 100 including the capacitance element 7 in which a change in capacitance is small even when a dielectric layer is misaligned.

In the description of the present preferred embodiment, the outline of the electrode portion of each of the first electrode patterns is present within the outline La of the third electrode patterns, and the electrode portion of each of the second electrode patterns is present within the outline Lb of the fourth electrode patterns. In contrast, the outline of the electrode portion of each of the third electrode patterns may be present within the outline of the first electrode patterns, and the electrode portion of each of the fourth electrode patterns may be present within the outline of the second electrode patterns.

The capacitance element 7 is preferably provided in the multilayer substrate 2. In the capacitance element 7, an electric charge is accumulated by using not only the first to fourth electrode patterns but also the external electrodes 29a and 29b of the multilayer substrate 2 (see FIG. 5). Therefore, the capacitance value C of the capacitance element 7 provided in the multilayer substrate 2 can be increased. Thus, the size of the loop 8c included in the inductance element 8 can be reduced, enabling the area occupied by the loop 8c in the radiation conductor 5 to be reduced. Therefore, the size of the multilayer substrate 2 can be reduced, and the area for other circuit components in the PCB 4 can be increased.

If the multilayer substrate 2 includes an inductance element including a coil pattern or a meander pattern, magnetic coupling occurs between the inductance element including a coil pattern or the like and the loop 8c located on the radiation conductor 5 via mutual inductance depending on the position at which the inductance element is arranged. Misalignment of the mounting position of the multilayer substrate 2 on the PCB 4 causes variation in mutual inductance, resulting in variation in the resonant frequency of the resonant circuit 9. In the wireless communication device 100, the multilayer substrate 2 does not include an inductance element such as a coil, and no target for magnetic coupling with the loop 8c is present, resulting in no variation in the resonant frequency of the resonant circuit 9.

If the multilayer substrate 2 includes a coil pattern, the plane electrodes included in the multilayer substrate 2 prevent the coil from generating magnetic flux. As a result, the Q value of the coil is apt to be degraded. In the wireless communication device 100, since the multilayer substrate 2 does not include a coil for forming the resonant circuit, it is not necessary to consider such degradation of the Q value, and degradation of the operating Q of the resonant circuit can be also significantly reduced or prevented.

Modified Preferred Embodiments

Figure 6A:
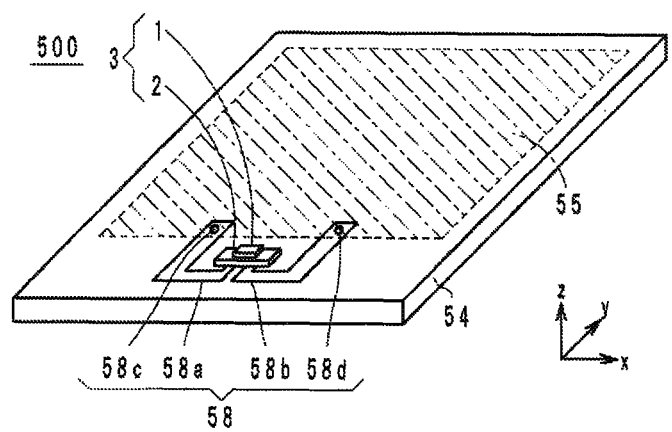
FIG. 6A is a perspective view illustrating a wireless communication device according to a modified preferred embodiment of the present invention.
Figure 6B:
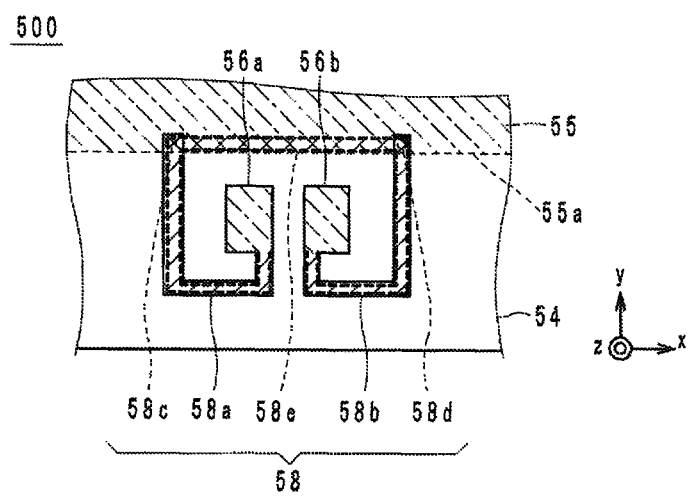
FIG. 6B is an enlarged view of a principal portion of the wireless communication device in FIG. 6A, viewed in a stacking direction.

Referring to FIGS. 6A and 6B, the wireless communication device 500 according to a modified preferred embodiment of the above-described preferred embodiment will be described in detail.

Compared with the wireless communication device 100, the wireless communication device 500 includes a PCB 54, a radiation conductor 55, first and second land electrodes 56a and 56b, and an inductance element 58, instead of the PCB 4, the radiation conductor 5, the first and second land electrodes 6a and 6b, and the inductance element 8. Other than that, no difference is present between the wireless communication devices 100 and 500. In FIGS. 6A and 6B, components corresponding to those in the configuration illustrated in FIGS. 1A and 1B are designated with identical reference numbers, and will not be described. For the sake of convenience, the first and second land electrodes 56a and 56b are not illustrated in FIG. 6A, and the feeding device 3 is not illustrated in FIG. 6B.

The PCB 54 is similar to the PCB 4 except that the PCB includes a multilayer body, for example, including multiple insulator layers. The radiation conductor 55 having a rectangular or substantially rectangular shape is provided between the insulator layers. Similarly to the above-described preferred embodiment, the radiation conductor 55 also functions as a ground conductor 55 for electronic components provided in the PCB 54.

The land electrodes 56a and 56b are preferably composed of the same conducting material as that of the radiation conductor 55, and are preferably formed on the principal surface (top surface) of the PCB 54 through, for example, printing. Specifically, in plan view in the arrow z direction, the land electrodes 56a and 56b are located at a predetermined distance in the opposite direction of the arrow y from an edge 55a of the radiation conductor 55. Similarly to the land electrodes 6a and 6b, the land electrodes 56a and 56b are arranged separately from each other in the x direction so that the multilayer substrate 2 can be mounted thereon.

The inductance element 58 is located outside the multilayer substrate 2, and includes a first loop conductor 58a and a second loop conductor 58b having a predetermined line width. The loop conductor 58a extends in the opposite direction of the arrow y from the land electrode 56a, and bends and extends in the opposite direction of the arrow x. Then, the loop conductor 58a further extends in the forward direction of the arrow y until it overlaps the radiation conductor 55 in plan view in the arrow z direction.

The loop conductor 58b extends in the opposite direction of the arrow y from the land electrode 56b, and bends and extends in the forward direction of the arrow x. Then, the loop conductor 58b further extends in the forward direction of the arrow y until it overlaps the radiation conductor 55 in plan view in the arrow z direction.

The above-described loop conductors 58a and 58b are electrically connected to the radiation conductor 55 located between the layers of the PCB 54 through first and second via hole conductors 58c and 58d.

The loop conductors 58a and 58b, the via hole conductors 58c and 58d, and the edge 55a of the radiation conductor 55 described above define a loop 58e as represented by the dotted line in FIG. 6B. Specifically, the loop 58e extends from the land electrode 56a through the loop conductor 58a, the via hole conductor 58c, the edge 55a, the via hole conductor 58d, and the loop conductor 58b to the land electrode 56b.

The above-described configuration also enables the inductance element 8 as in the above-described preferred embodiment to be provided.

In the foregoing description, the wireless communication devices 100 and 500 each are preferably an RFID tag. The present invention is not limited to this. The wireless communication devices 100 and 500 each may be installed in a reader/writer, for example. In the wireless communication devices 100 and 500, the ground conductors provided on/in the PCBs 4 and 54 are preferably used as the radiation conductors 5 and 55, respectively, for example. Thus, the sizes of the wireless communication devices 100 and 500 can be reduced. Accordingly, the wireless communication devices 100 and 500 are suitable to be installed in a communication device such as a cellular phone, for example.

It is not necessary for the wireless IC device 1 to be located on the top surface of the multilayer substrate 2. The wireless IC device 1 may be embedded in the multilayer substrate 2, or may be disposed at a location different from that of the multilayer substrate 2.

Instead of using also as a ground conductor provided on/in a corresponding one of the PCBs 4 and 54, each of the radiation conductors 5 and 55 may be a planar conductor located on/in, for example, a flexible substrate or a rigid substrate, and may have only functions as a radiation conductor. Other than that, as the radiation conductors 5 and 55, a metal case installed on the PCBs 4 and 54, the metal housing of a communication terminal, or the like may be used as a radiation conductor.

The wireless communication device according to various preferred embodiments of the present invention has an effect of enabling reduction in insertion loss or an effect of making it difficult for variation in capacitance to occur even when a dielectric layer is misaligned, and is suitable for an RFID tag or a reader/writer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a wireless IC device;
   a multilayer substrate including a stack of a plurality of dielectric layers;
   a resonant circuit connected to the wireless IC device, the resonant circuit including a capacitance element and an inductance element; and
   a radiation conductor connected to the resonant circuit; wherein
   of the capacitance element and the inductance element included in the resonant circuit, only the capacitance element is provided inside of the multilayer substrate;
   the inductance element of the resonant circuit is provided outside of the multilayer substrate and not inside the multilayer substrate;
   each of the capacitance element and the inductance element are connected in parallel to the wireless IC device; and
   the inductance element and the radiation conductor are provided on or in a common substrate.

2. The wireless communication device according to claim 1, wherein the capacitance element includes:
   first and second electrode patterns located on at least one of the plurality of dielectric layers; and
   third and fourth electrode patterns located on at least another one of the plurality of dielectric layers and opposed to the first and second electrode patterns; wherein
   the first and fourth electrode patterns have an identical or substantially identical potential, and the second and third electrode patterns have an identical or substantially identical potential; and
   in plan view in a stacking direction of the plurality of dielectric layers, an outline of one of the first and third electrode patterns is located inside an outline of the other of the first and third electrode patterns, and an outline of one of the second and fourth electrode patterns is located inside an outline of the other of the second and fourth electrode patterns.

3. The wireless communication device according to claim 1, wherein
   the multilayer substrate includes first and second external electrodes disposed on one of a principal surface of the multilayer substrate and a back surface of the multilayer substrate opposite to the principal surface, the first and second external electrodes being arranged to connect the multilayer substrate to a printed circuit board;

the capacitance element includes first and second electrode patterns located on at least one of the plurality of dielectric layers, the first and second electrode patterns being opposed to the first and second external electrodes in a stacking direction of the plurality of dielectric layers; and in plan view in the stacking direction, the first electrode pattern has the same or substantially the same outline dimensions as outline dimensions of the first external electrode, and the second electrode pattern has the same or substantially the same outline dimensions as outline dimensions of the second external electrode.

4. The wireless communication device according to claim 1, wherein the inductance element includes a loop defined by at least a portion of the radiation conductor.

5. The wireless communication device according to claim 1, wherein the wireless IC device is configured to input/output a high frequency signal obtained by modulating a carrier by using information that is to be transmitted; and a resonant frequency of the resonant circuit is equal or substantially equal to a frequency of the carrier.

6. The wireless communication device according to claim 1, wherein the wireless IC device is mounted on a principal surface of the multilayer substrate.

7. The wireless communication device according to claim 1, wherein the radiation conductor defines a ground conductor located on or in a printed circuit board.

* * * * *